United States Patent
Ma et al.

(10) Patent No.: US 12,039,628 B2
(45) Date of Patent: Jul. 16, 2024

(54) VIDEO MASK LAYER DISPLAY METHOD, APPARATUS, DEVICE AND MEDIUM

(71) Applicant: BEIJING ZITIAO NETWORK TECHNOLOGY CO., LTD., Beijing (CN)

(72) Inventors: Xiaotong Ma, Beijing (CN); Yujie Li, Beijing (CN)

(73) Assignee: BEIJING ZITIAO NETWORK TECHNOLOGY CO., LTD. (CN)

( * ) Notice: Subject to any disclaimer, the term of this patent is extended or adjusted under 35 U.S.C. 154(b) by 155 days.

(21) Appl. No.: 17/724,670

(22) Filed: Apr. 20, 2022

(65) Prior Publication Data
US 2023/0022105 A1 Jan. 26, 2023

(30) Foreign Application Priority Data
Jul. 23, 2021 (CN) .......................... 202110839654.3

(51) Int. Cl.
G06T 11/00 (2006.01)
G06T 7/60 (2017.01)

(52) U.S. Cl.
CPC ............... *G06T 11/00* (2013.01); *G06T 7/60* (2013.01); *G06T 2207/10016* (2013.01)

(58) Field of Classification Search
None
See application file for complete search history.

(56) References Cited

U.S. PATENT DOCUMENTS

| 7,962,004 B2 * | 6/2011 | Kaneko | H04N 21/4325 386/200 |
| 2009/0207305 A1 * | 8/2009 | Fujita | H04N 21/4314 348/E7.001 |
| 2009/0249393 A1 * | 10/2009 | Shelton | H04N 21/2368 375/E7.076 |
| 2012/0120312 A1 | 5/2012 | Yamasaki et al. | |
| 2017/0150213 A1 * | 5/2017 | Cremer | H04N 21/4325 |
| 2018/0033164 A1 * | 2/2018 | Seo | G06T 11/60 |
| 2022/0101013 A1 * | 3/2022 | Chatoo | H04N 21/23418 |

(Continued)

FOREIGN PATENT DOCUMENTS

| CN | 105957544 A | 9/2016 |
| CN | 108881995 A | 11/2018 |
| CN | 109429077 A | 3/2019 |

(Continued)

OTHER PUBLICATIONS

Search Report for PCT Application No. PCT/CN2022/094348 mailed Aug. 2, 2022.

*Primary Examiner* — Ryan M Gray

(57) ABSTRACT

Embodiments of the present disclosure relate to a video mask layer display method, apparatus, device and medium. The method includes: determining a mask layer covering region in a video frame, wherein the mask layer covering region comprises: a first region that matches target information displayed by contrast, and a second region that effects a color transition from the first region to other video picture portion on which no mask layer covering region is provided; acquiring a target mask layer that matches the first region and the second region and has a transparency gradient from the first region to the second region; superimposing the target mask layer on the mask layer covering region of the video frame.

14 Claims, 6 Drawing Sheets determining the mask layer covered region in a video frame, wherein the mask layer covered region comprises: a first region that matches target information displayed by contrast, and a second region that effects a color transition from the first region to another video picture portion on which no mask layer covered region is provided — 101 obtaining a target mask layer that matches the first region and the second region and has a transparency gradient from the first region to the second region — 102 superimposing the target mask layer on the mask layer covered region in the video frame to display the target information by contrast — 103

(56) References Cited

U.S. PATENT DOCUMENTS

2022/0148227 A1\* 5/2022 Echevarria Vallespi ..................... G06V 10/56
2023/0005107 A1\* 1/2023 Gopalkrishna ........... G06T 7/11

FOREIGN PATENT DOCUMENTS

| CN | 111107422 A | 5/2020 |
| CN | 111488244 A | 8/2020 |

\* cited by examiner rectangle-shaped mask layer pattern radical mask layer pattern

VIDEO MASK LAYER DISPLAY METHOD, APPARATUS, DEVICE AND MEDIUM

CROSS-REFERENCE TO RELATED APPLICATIONS

The present application is based on the application with a CN application number of 202110839654.3 and the filing date being Jul. 23, 2021, and claims its priority. The disclosure of this CN application as a whole is incorporated into the present application herein by reference.

TECHNICAL FIELD

This disclosure relates to the technical field of information processing, in particular to a video mask layer display method, apparatus, device and medium.

BACKGROUND

Due to the influence of the background color of a video picture, a user viewing a video may experience poor readability of the text and other information displayed on the video. In order to make text and other information on a video easier to read visually, a mask layer process is usually performed on a video picture.

Currently, fixed mask layer templates are used in covering process on video pictures.

SUMMARY

In a first aspect, an embodiment of the present disclosure provides a video mask layer display method, comprising: determining a mask layer covering region in a video frame, wherein the mask layer covering region comprises a first region that matches target information displayed by contrast, and a second region that effects a color transition from the first region to other video picture portion of the video frame on which no mask layer covering region is provided; acquiring a target mask layer that matches the first region and the second region and has a transparency gradient from the first region to the second region; superimposing the target mask layer on the mask layer covering region to display the target information by contrast.

In an optional implementation, one or more region parameters of the first region are set in association with a size of the target information.

In an optional implementation, the target information comprises: the target information comprises at least one of text information on the video frame picture that matches a preset information category, or text information or symbol information that matches a preset color identification on the video frame.

In an optional implementation, in a case where the target information comprises publisher information and video description information disposed in sequence at the bottom of the video frame, the determining a mask layer covering region in a video frame comprises: calculating a first height from the publisher information to the bottom of the video frame, and determining the first region according to the first height and a width of the video frame, if the publisher information and the video description information are aligned with left and right sides of the video frame.

In an optional implementation, in a case where the target information comprises publisher information and video description information disposed in sequence at the bottom of the video frame, the determining a mask layer covering region in a video frame comprises: calculating a second height from the publisher information to the bottom of the video frame, and determining the first region according to the second height and an end position of each line of the publisher information and the video description information, if the publisher information and the video description information are aligned with the left side of the video frame.

In an optional implementation, in a case where the target information comprises publisher information and video description information disposed in sequence at the bottom of the video frame, the determining a mask layer covering region in a video frame comprises: calculating a third height from the publisher information to the bottom of the video frame, and determining the first region according to the third height and a starting position of each line of the publisher information and the video description information, if the publisher information and the video description information are aligned with the right side of the video frame.

In an optional implementation, the determining a mask layer covering region in a video frame comprises: determining size of the second region disposed adjacent to the first region, according to a preset correlation and at least one of a width of the video frame, a height of the video frame or a ratio of the first region to the video frame.

In an optional implementation, the determining a mask layer covering region in a video frame comprises: determining an extension boundary line extending from the first region to another region of the video frame;
determining an extension amount according to one or more region parameters of the other region and the first region; determining the second region along the extension boundary line according to the extension amount.

In an optional implementation, the determining an extension amount according to one or more region parameters of the other region and the first region comprises: determining the extension amount according to a region shape of the other region and a region shape the first region; or determining the extension amount according to a region size of the other region and a region size the first region.

In an optional implementation, acquiring a target mask layer that matches the first region and the second region and has a transparency gradient from the first region to the second region comprises: performing a gradient process on a mask layer matching sizes of the first region and the second region according to a preset nonlinear curve function to acquire a target mask layer having a transparency gradient from the first region to the second region.

In an optional implementation, acquiring a target mask layer that matches the first region and the second region and has a transparency gradient from the first region to the second region comprises: acquiring a mask layer pattern having a transparency gradient from the first region to the second region according to a splicing shape of the first and second regions; cutting a target mask layer that matches sizes of the first and the second regions out from the mask layer pattern.

In an optional implementation, acquiring a mask layer pattern having a transparency gradient from the first region to the second region according to a splicing shape of the first and second regions comprises: in a case where the splicing shape of the first region and the second region comprises a fan shape, acquiring a radial mask layer pattern, wherein the radial mask layer pattern comprises a fan-shaped region having a transparency gradient from the first region to the second region; or in a case where the splicing shape of the first region and the second region comprises a rectangular shape, acquiring a rectangular mask layer pattern, wherein the rectangular mask layer pattern comprises a rectangular region having a transparency gradient from the first region to the second region.

In an optional implementation, superimposing the target mask layer on the mask layer covering region in the video frame comprises at least one of the following steps: superimposing the target mask layer on a mask layer covering region at the top of the video frame, or superimposing the target mask layer on a mask layer covering region at the bottom of the video frame.

In a second aspect, an embodiment of the present disclosure provides a video mask layer display apparatus, comprising: a determination module for determining a mask layer covering region in a video frame, wherein the mask layer covering region comprises: a first region that matches target information displayed by contrast, and a second region that effects a color transition from the first region to other video picture portion on which no mask layer covering region is provided; an acquisition module for acquiring a target mask layer that matches the first region and the second region and has a transparency gradient from the first region to the second region; a processing module for superimposing the target mask layer on the mask layer covering region in the video frame to display the target information by contrast.

In a third aspect, the present disclosure provides a non-transitory computer-readable storage medium having instructions stored therein, wherein the instructions, when executed on a terminal device, cause the terminal device to implement the video mask layer display method described above.

In a fourth aspect, an embodiment of the present disclosure provides an electronic device, comprising: a processor; a memory for storing processor executable instructions; wherein the processor is used to read the executable instructions from the memory and execute the instructions to implement the above method.

In a fifth aspect, the present disclosure provides a computer program product, wherein the computer program product comprises a computer program/instructions, which implements the above method when executed by a processor.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale.

DETAILED DESCRIPTION

Figure 1:
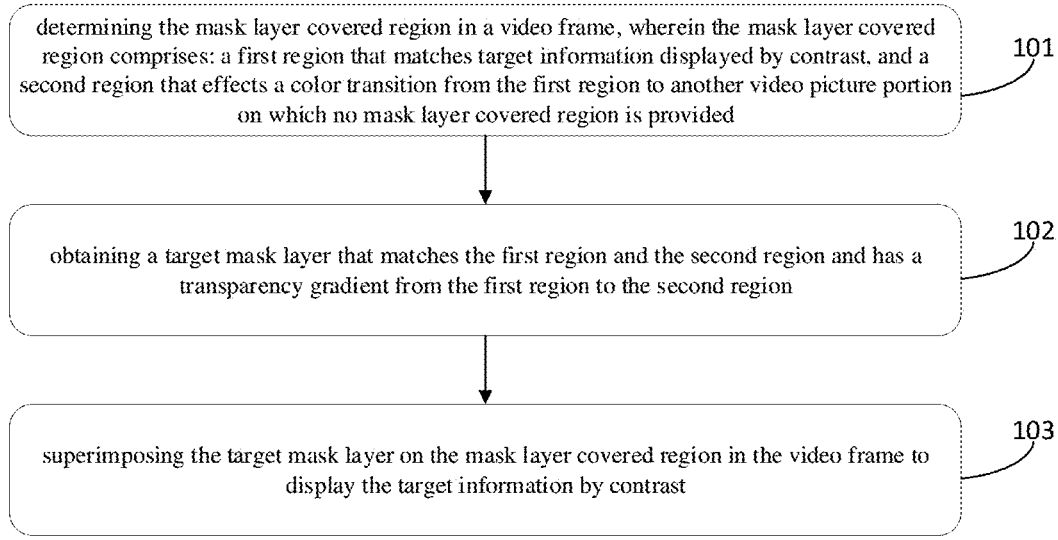
FIG. 1 is a schematic flowchart of a video mask layer display method provided in an embodiment of the present disclosure.

Exemplary embodiments of the present disclosure will now be described in detail with reference to the accompanying drawings. Although some embodiments of the present disclosure are shown, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may comprise additional steps and/or some of the illustrated steps may be omitted. The scope of this disclosure is not limited in this regard.

The term "comprising" and its variants as used herein is an open-ended mode expression, that is, "comprising but not limited to". The term "based on" means "based at least in part on". The term "one embodiment" means "at least one embodiment"; The term "another embodiment" means "at least one additional embodiment"; The term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

Information such as text on video pictures may change dynamically with the content posted by the publisher, the size and color of a fixed mask layer template cannot be adjusted adaptively, so that a fixed mask layer template may lead to unnecessary occlusion of a video picture, a decrease in the original color saturation of the video, and unexpected colors.

In order to solve or at least partially solve the above technical problem, the present disclosure provides to a video mask layer display method, apparatus, device and medium.

In order to solve the above problem, an embodiment of the present disclosure provides a method for displaying a video mask layer, which will be described below with reference to specific embodiments.

FIG. 1 is a schematic flowchart of a video mask layer display method provided by an embodiment of the present disclosure. The method can be executed by a video mask layer display apparatus, wherein the apparatus can be implemented by software and/or hardware, and can generally be integrated in an electronic device. As shown in FIG. 1, the method comprises:

Step 101: determining the mask layer covering region in a video frame, wherein the mask layer covering region comprises: a first region that matches target information displayed by contrast, and a second region that effects a color transition from the first region to other video picture portion on which no mask layer covering region is provided.

Information can be added to a video, such as its video description information. However, in some application scenarios, the color of a video picture is highly similar to the color of the information added on the video, so that the information added on the video cannot be displayed clearly. Therefore, in order to improve the viewing effect of the information added to a video frame when viewing the video, a mask layer process needs to be performed for the information added to the video frame. The color of the video picture will change after adding a mask layer, such that the information added to the video can be clearly displayed by contrast of the mask layer.

According to practical needs, various types and colors of information can be added to a video, such as video theme information, description information, interaction information with a user, etc., and/or special effects props information added by an application to the video, and music Information, etc. The colors used for different types of information and the addition positions in the video picture can be dynamically designed and adjusted as needed. Therefore, according to the needs of different scenarios, all the added information can be displayed with a mask layer, or only part of the added information can be displayed with a mask layer. In the embodiment of the present disclosure, the information added to the video that needs to be displayed with a mask layer is the target information. It should be noted that there are various methods for determining the target information, which may be selected according to application scenarios, and will not limited in this embodiment. For a clearer understanding of how to determine the target information that needs to be contrasted by a mask layer, an example is given as follows.

In an optional implementation, the target information is text information on a video frame that matches a preset information category. It can be understood that there may be various information categories on a video frame, such as creator name, special effect name, video description, music name, etc. For different information categories, users have different degrees of viewing needs. For example: when a user is viewing a video frame, more attention is generally given to video description type information of the video. Therefore, the category of information that needs to be contrasted by a mask layer can be preset as required, and some added information matching the preset information category is obtained from the information added to the video as the target information. For example, when the preset information category is video description type information, the video description information is determined from all the added information on the video as the target information that needs to be displayed with a mask layer.

In another optional implementation, the target information is text information or symbol information matching a preset color identification on a video frame image. The color identification that needs to be contrasted by a mask layer can be preset as required, and some added information matching the preset color identification can be obtained from the information added on the video as the target information. For example, if the preset color identification is white, white text addition information and/or symbol information is determined from all the added information on the video as the target information that needs to be displayed with a mask layer.

According to different videos and actual needs, the position, layout, and content of the target information that needs to be displayed with a mask layer on the video picture are dynamically changed. For example, the target information may be located in one or more of the lower left or upper right of the video. It should be noted that, in this embodiment, there may be one or more pieces of target information, which is not limited in this embodiment. Therefore, in order to reduce the influence of the mask layer on the video picture area that does not need to be displayed by contrast, and to achieve a natural color transition between the target information that needs to be displayed by contrast and the other video picture portion, the embodiment of the present disclosure proposes a process of dynamic and adaptive mask layer adjustment, which will be described in detail as follows.

First, a mask layer covering region in a video frame is determined, wherein the mask layer covering region comprises: a first region that matches target information displayed by contrast, and a second region that effects a color transition from the first region to other video picture portion on which no mask layer covering region is provided. It can be seen that region parameters (e.g., height, size, shape, etc.) of the first region used to contrast the target information in the mask layer covering region in this implementation are dynamically matched with the size of an area where the target information is located. Therefore, the first region is determined correspondingly according to factors such as the size of the area where the target information is located. It should be noted that, in this embodiment, there may be one or more pieces of target information, and correspondingly, there may be one or more first regions used to display the target information by contrast, which is not limited in this embodiment. In order to explain more clearly how to determine the first region according to the target information that needs to be displayed with a mask layer in a video frame, taking a case where the target information is publisher information and video description information disposed in sequence at the bottom of the video frame as an example, how to determine the first region that is used to contrast the target information will be particularly described as follows.

Figure 2A:
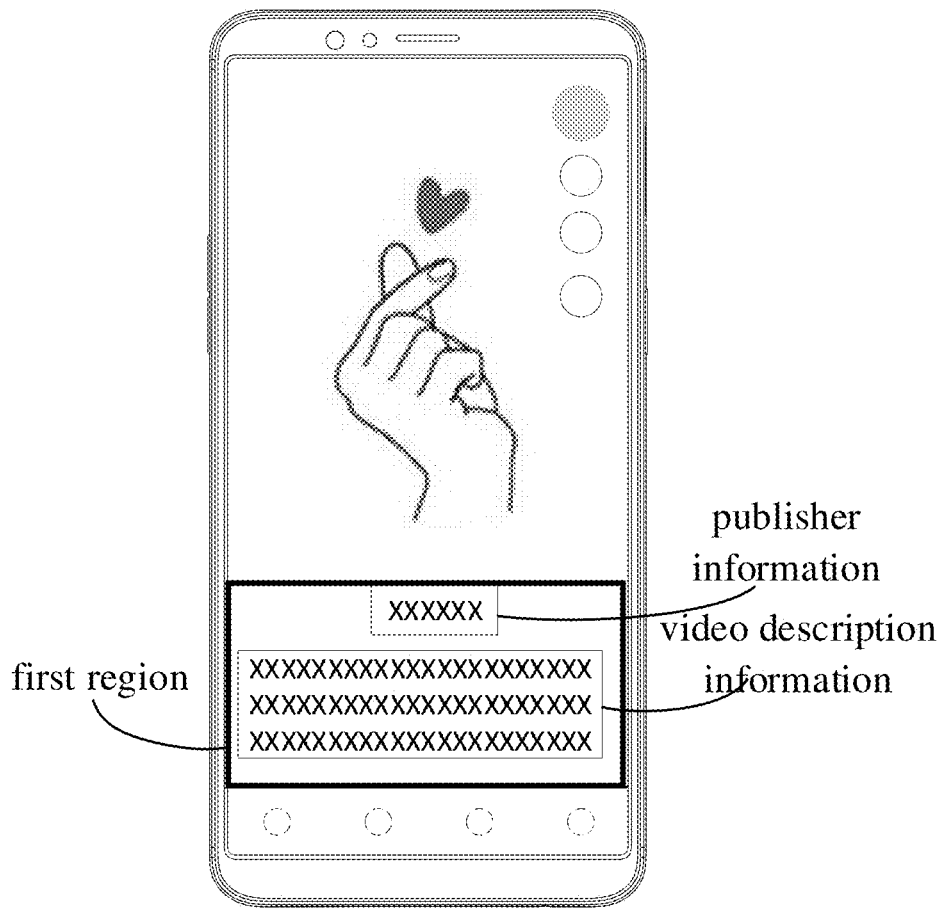
FIG. 2a is a schematic diagram of a first region provided in an embodiment of the present disclosure.

In some application scenarios, the publisher information and video description information are displayed in sequence at the bottom of a video frame, wherein the video description information is located below the publisher information, and the target information comprises the publisher information and the video description information. Thus, the corresponding first region can be determined according to the amount of the publisher information and the video description information, as well as their layout position, etc. Application scenarios comprises but not limited to the following three scenarios:

Scenario 1, as shown in FIG. 2a, the publisher information and the video description information are aligned with left and right sides of the video frame. In this case, since the publisher information and the video description information at the bottom of the video are aligned with left and right sides of the video, there is no free video picture portion from the information to the video borders. Therefore, a first height from the publisher information to the bottom of the video frame is calculated, and the first region is determined according to the first height and a width of the video frame, so that the first region dynamically varies with the target information, thereby reducing the impact on the color of other video frame portion without information added in the video frame. The first region is shown by the bold solid line in FIG. 2a.

Figure 2B:
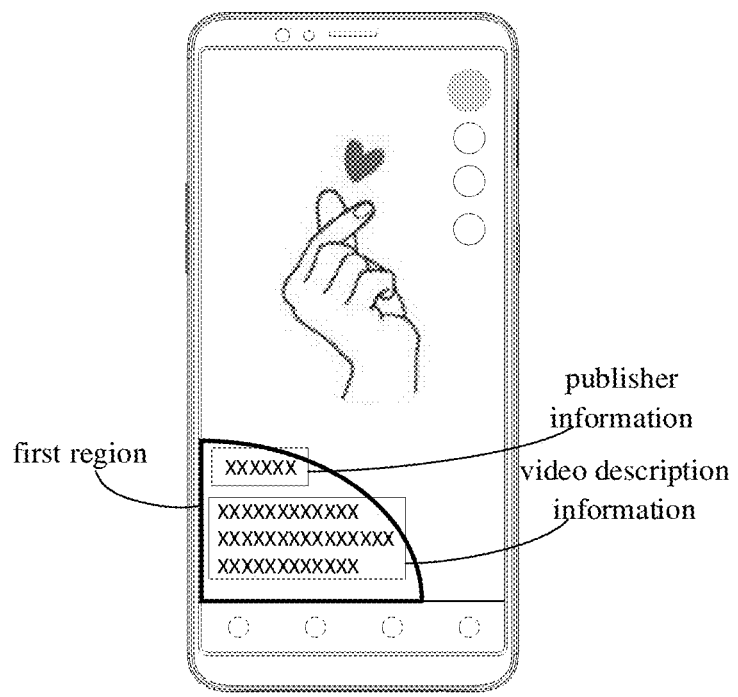
FIG. 2b is a schematic diagram of another first region provided in an embodiment of the present disclosure.

Scenario 2, as shown in FIG. 2b, the publisher information and the video description information are aligned with the left side of the video frame. In this case, since the publisher information and the video description information at the bottom of the video are aligned with the left side of the video, there is a free video picture portion without information added from the information to the right video border. Therefore, a second height from the publisher information to the bottom of the video frame is calculated, and the first region is determined according to the second height and the end position of each line of the publisher information and the end position of each line of the video description information, so that the first region dynamic varies with the target information, thereby reducing the impact on the color of the free video frame portion without information added in the video frame. The first region is shown by the bold solid line in FIG. 2b.

Figure 2C:
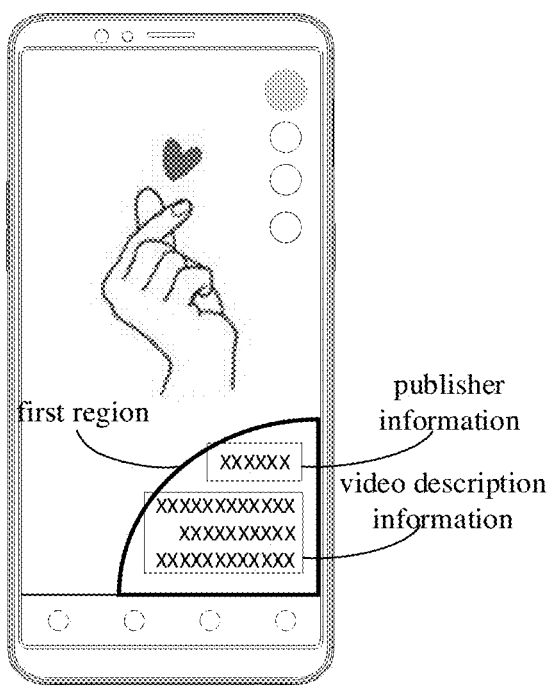
FIG. 2c is a schematic diagram of still another first region provided in an embodiment of the present disclosure.

Scenario 3, as shown in FIG. 2c, the publisher information and the video description information are aligned with the right side of the video frame. In this case, since the publisher information and the video description information at the bottom of the video are aligned with the right side of the video, there is a free video picture portion without information added from the information to the left video border. Therefore, a third height from the publisher information to the bottom of the video frame is calculated, and the first region is determined according to the third height and the starting position of each line of the publisher information and the starting position of each line of the video description information, so that the first region dynamic varies with the target information, thereby reducing the impact on the color of the free video frame portion without information added in the video frame. The first region is shown by the bold solid line in FIG. 2c.

Furthermore, in order to achieve a natural color transition between the target information that needs to be displayed by contrast and the other video picture portion on which no mask layer process is performed, a second region for color transition in the video picture is arranged adjacent to the first region. It can be seen that the function of the second region of the mask layer covering region is different from that of the first region. The second region can be used for color transition in the video picture from the first region to another region on which no mask layer covering region is provided, and is a transition area having a gradient from a color of the mask layer displayed as a contrast to transparency. It should be noted that, in this embodiment, there may be one or more first regions, and one or more second regions correspondingly. Since the first region is determined through a matching with the region of the target information and the size of a region where the target information is located, and the second region is used for color transition from the first region to a video picture portion on which no mask layer covering region is provided in the video frame, the second region may be specifically determined according to the boundary of the first region and the conditions of a region that can be extended outward. It should be noted that the second region can be determined in different ways according to the application scenario. For example, according to the width and/or height of the video, and/or a ratio of the first region (to the video frame), the size of a second region disposed adjacent to the first region can be determined according to a preset correlation, so as to achieve color transition and make the video picture color natural and smooth. In order to explain the method for determining the second region more clearly, an example will be given as follows:

Step a: determining an extension boundary line that can extend from the first region to another region of the video frame.

Figure 3A:
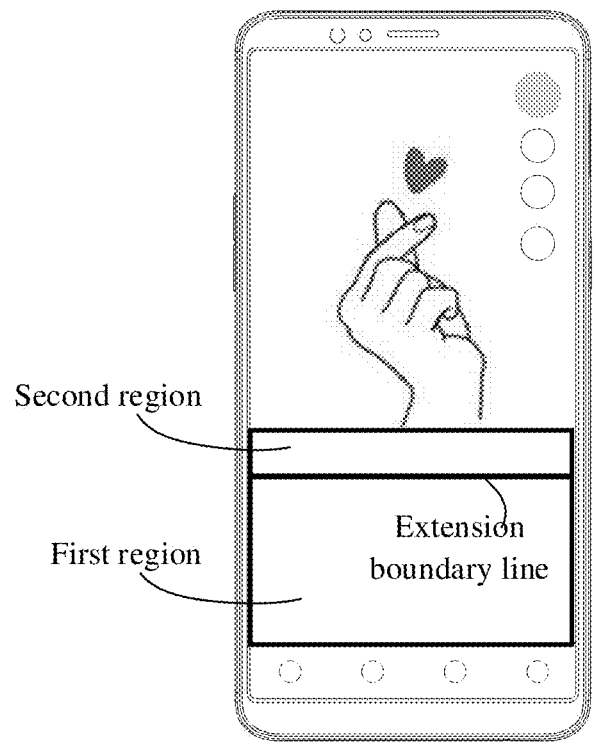
FIG. 3a is a schematic diagram of an extension boundary line and a second region provided in an embodiment of the present disclosure.
Figure 3B:
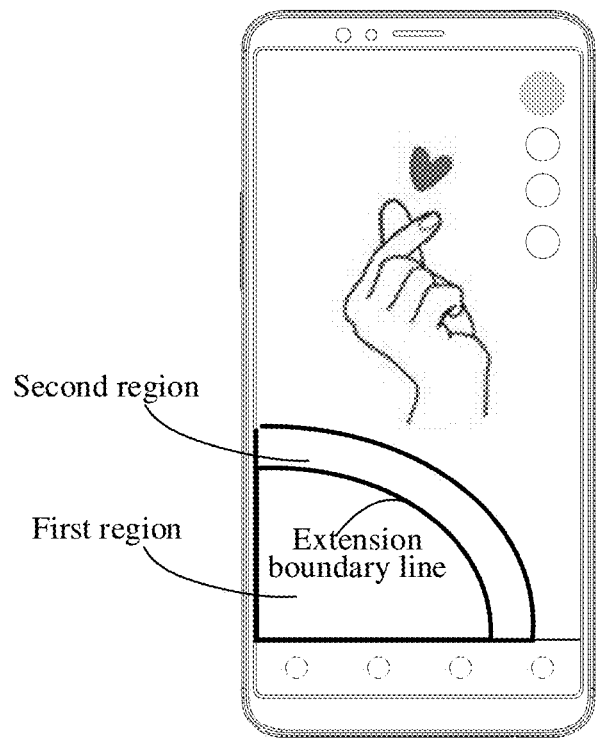
FIG. 3b is a schematic diagram of another extension boundary line and a second region provided in an embodiment of the present disclosure.
Figure 3C:
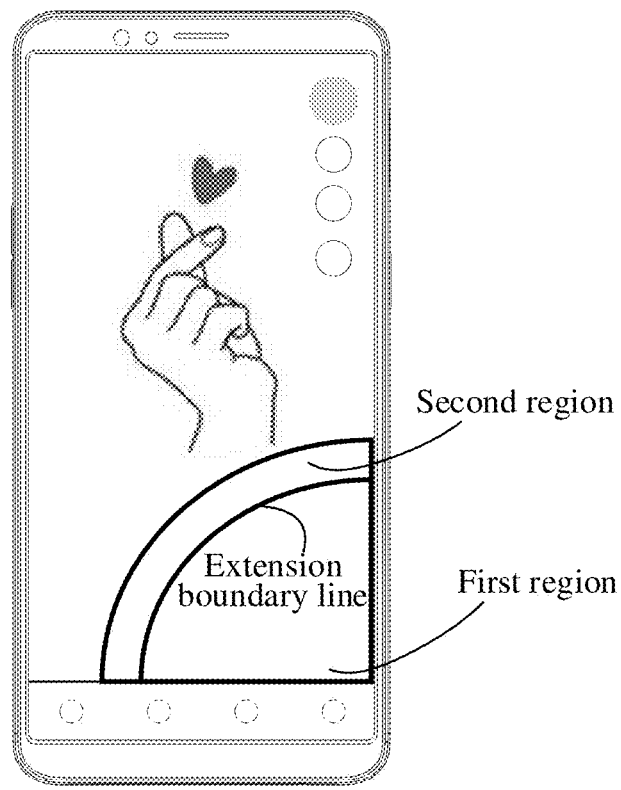
FIG. 3c is a schematic diagram of still another extension boundary line and a second region provided in an embodiment of the present disclosure.

First, it is necessary to determine an extension boundary line, which is the boundary line that can extend to another region of the video frame. In some application scenarios, the first region has multiple boundary lines, but not every boundary line can extend to another region of the video frame. Based on again the above example shown in FIGS. 2a, 2b and 2c, for example, as shown in FIG. 3a, if the first region is a rectangular area at the bottom of the video frame, only the upper one of the four boundary lines can extend to another region of the video frame, and this boundary line is an extension boundary line; as shown in FIG. 3b, if the first region is a fan-shaped area at the lower left of the video frame, only the arc line of the three boundary lines can extend to another region of the video frame, and the arc boundary line is an extension boundary line; similar to that shown in FIG. 3b, as shown in FIG. 3C, if the first region is the fan-shaped area at the lower right of the video frame, only the arc line of the three boundary lines can extend to another region of the video frame, and the arc boundary line is an extension boundary line.

Step b: determining an extension amount according to region parameters of the other region and the first region.

Step c: determining the second region along the extension boundary line according to the extension amount.

Further, an extension amount is determined according to region parameters of the other region and the first region. Wherein, different region parameters can be selected to determine the extension amount according to the needs of the application scenario. For example, a correlated extension amount can be determined according to the area size of the other region and the area size of the first region, or a correlated extension amount can be determined according to the area shape of the other region and the area shape of the first region. Further, the second region can be determined along the extension boundary line according to the extension amount. In order to explain the determination process of the second region more clearly, an example will be given as follows:

As shown in FIG. 3a, if the first region is rectangular and the extension boundary line is the upper boundary line of the rectangle, according to a correlation between the preset extension amount and the shape of the first region and the other region, when it is determined that the first region and the other region are rectangular, the corresponding correlated extension amount is $\frac{1}{3}$ of the height of the first region. Therefore, the second region is determined by extending upward along the extension boundary line by an extension amount of ⅓ of the height of the first region. Therefore, the second region is a rectangle above the first region in FIG. 3a. As shown in FIG. 3b, the extension boundary line is an arc line of a sector. According to a correlation between the preset extension amount and the areas of the first region and the other region, it is determined that the extension amount correlated to the areas of the first region and the other region shown in FIG. 3b is ⅙ of the sector radius of the first region. Therefore, the second region is determined by extending upward along the extension boundary line by an extension amount of ⅙ of the height of the first region. Therefore, if the first region is a sector at the lower left of the video frame, the second region is a quarter ring extending outward from the first region in FIG. 3b; as shown in FIG. 3c, if the first region is a sector at the lower right of the video frame, the second region is a quarter ring extending outward from the first region in FIG. 3c, wherein the process of determining the extension amount is the same as the determination process of the extension amount in FIG. 3b, which will not be repeated herein.

It can be understood that a too large extension amount is not suitable because it may cause a too large area of the second region determined according to the extension amount, resulting in a too large area of the video frame affected by the mask layer; a too small extension amount is also not suitable because it may cause a too small transparency gradient region, making the color transition unnatural. Therefore, the extension amount can be determined according to the other region and the first region, to ensure an appropriate ratio of the second region to the other region without affecting the video frame to a great extent, and an appropriate ratio of the second region to the first region to achieve a coordinate visual effect. In an optional embodiment, the corresponding relationship between the other region, the first region and the extension amount can be stored in advance according to test calibration, and the extension amount can be obtained by searching in a storage according to the other region and the first region.

Step 102: obtaining a target mask layer that matches the first region and the second region and has a transparency gradient from the first region to the second region.

After determining the first region and the second region, a target mask layer adaptively matching the sizes of the first region and the second region can be determined. Since the first region is used for the contrast display of the target information and the second region is used for picture color transition, the transparency of the target mask layer corresponding to the first region is generally low, the transparency of the target mask layer corresponding to the second region is generally high, and the target mask layer has a transparency gradient from the first region to the second region. The target mask layer can be obtained in different ways as needed. The way of obtaining the target mask layer is not limited in the present embodiment, and will be specifically described as follows:

Based on the above embodiment, there are many ways to determine the target mask layer. For example, a target mask layer with a transparency gradient from the first region to the second region can be generated according to the sizes of the first region and the second region; it is also possible to obtain a target mask layer covering region that matches the sizes of the first region and the second region according to the splicing shape of the first region and the second region (for example, a mask layer pattern that matches the splicing shape of the first region and the second region can be selected from mask layer patterns with various gradient effects that are generated in advance with a mask layer tool, and then a target mask layer covering region matching the sizes of the first and second regions can be selected based on the selected mask layer pattern). Specifically, the acquisition of a target mask layer that matches the first region and the second region and has a transparency gradient from the first region to the second region in the above embodiment may comprise at least the following two scenarios:

Scenario 1: generate a target mask layer having a transparency gradient from the first region to the second region according to the sizes of the first region and the second region, which may comprise:

The fixed mask layer templates generated by current linear processes have an obvious sense of black segmentation, especially for video frames with light backgrounds, which may result in poor visual perception. Therefore, in this embodiment, a non-linear curve can be used to generate a target mask layer that can achieve a natural transition effect and improved visual perception. In an optional embodiment, the nonlinear curve comprises a Bezier curve, and gradient processing is performed on the mask layer matching the sizes of the first region and the second region according to a preset nonlinear curve function, to obtain a target mask layer that has a transparency gradient from the first region to the second region.

Scenario 2: obtain a target mask layer matching the sizes of the first and second regions according to a splicing shape of the first and second regions.

For example, a mask layer pattern that matches the splicing shape of the first region and the second region can be selected from mask layer patterns with various gradient effects that are generated in advance with a mask layer tool, and then a target mask layer covering region matching the sizes of the first and second regions can be selected based on the selected mask layer pattern, which may comprise the following steps.

First, a mask layer pattern having a transparency gradient from the first region to the second region can be obtained according to the splicing shape of the first and second regions.

Then, a target mask layer that matches the sizes of the first and second regions is cut out from the mask layer pattern.

Figure 4:
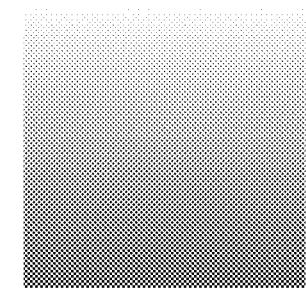
FIG. 4 is a schematic diagram of a rectangular mask layer pattern and a radial mask layer pattern provided in an embodiment of the present disclosure.
Figure 4:
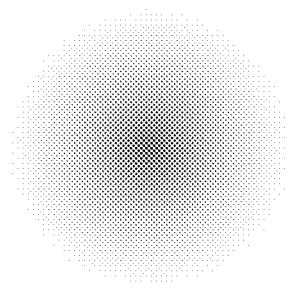
Figure 5A:
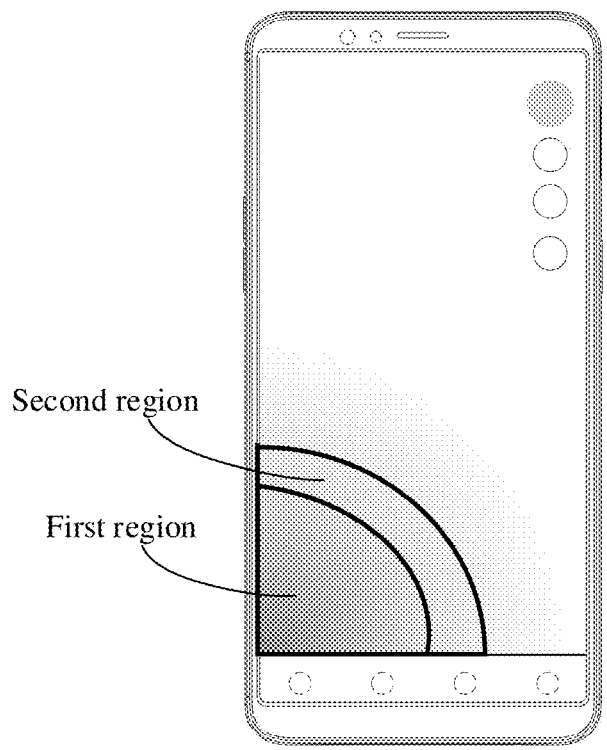
FIG. 5a is a schematic diagram of a process of superimposing a target mask layer on a first region and a second region provided in an embodiment of the present disclosure.

In this embodiment, a mask layer tool can be used to generate mask layer patterns with various gradient effects in advance, wherein, in order to achieve an excessively smooth color transition in the mask layer covering region of the video frame, a non-linear curve is used in this embodiment for color gradient processing, which can improve the visual perception through finer-grained color processing. In an optional embodiment, the nonlinear curve comprises a Bezier curve. The mask layer pattern generated by the mask layer tool can comprise a variety of mask layer patterns, such as: a circular mask layer pattern having a gradient from darkness at the center to transparency at the circle border in the radical direction, a rectangle mask layer pattern having a gradient from darkness at the top/bottom to transparency at the bottom/top, a rectangle mask layer pattern having a gradient from darkness at the left/right to transparency at the right/left, and so on. Then, the generated various mask layer pattern can be saved. According to the splicing shape of the first and second regions, a mask layer pattern gradually transparent from the first region to the second region is selected, and a target mask layer matching the sizes of the first and second regions is cut out from the selected mask layer pattern. In order to explain this process more clearly, an example will be given as follows:

In the case where the splicing shape of the first region and the second region is a fan shape, a circular mask layer pattern gradually changed from dark at the center to transparent at the circle border in the radical direction may be obtained from a storage, wherein the radial mask layer comprises a fan-shaped area that has a transparency gradient from the first region to the second region. As shown in FIG. 5a, in an optional embodiment, the shape and color of the radial mask layer are shown in the radial mask layer pattern of FIG. 4. The relationship between the radial mask layer pattern and the video frame is shown in FIG. 5a. In FIG. 5a, a target mask layer is generated through cutting it out from the radial mask layer pattern according to the parameters of the video frame. Optionally, in the event that the width of the video frame is 47% of the width of the radial mask layer pattern, through shifting the radial mask layer pattern from the center of the screen to the right side of the screen by 15% of the width of the video frame, and downward to horizontally bisect the radial mask layer pattern by the bottom of the video frame, a portion of the radical mask layer pattern that overlaps with the first region and the second region can be used as the target mask layer.

Figure 5B:
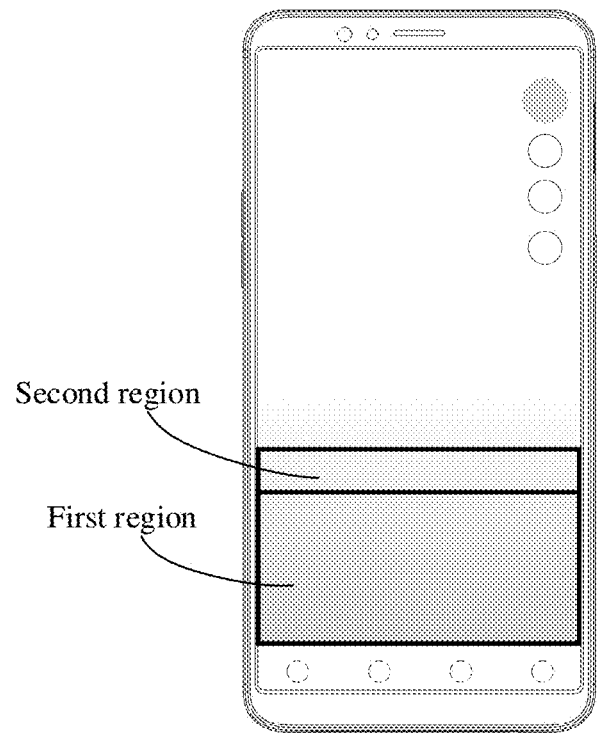
FIG. 5b is a schematic diagram of another process of superimposing a target mask layer on a first region and a second region provided in an embodiment of the present disclosure.

In the case where the splicing shape of the first region and the second region is a rectangle, a rectangle-shaped mask layer pattern can be obtained. The shape and color of the rectangle-shaped mask layer pattern are shown in the rectangle-shaped mask layer pattern of FIG. 4, wherein the rectangle mask layer pattern contains a rectangular region having a transparency gradient from the first region to the second region. Similar to the splicing shape that is a fan shape, when the splicing shape is a rectangle, a target mask layer matching the first region and the second region can also be cut out from the rectangular mask layer pattern according to the relative position and size relationship between the rectangular mask layer pattern and the video frame. In an optional implementation, the target mask layer is shown in FIG. 5b. It should be noted that, in this embodiment, the rectangular mask layer pattern may be generated based on a Bezier curve.

The above embodiments specifically describe two methods for generating a target mask layer, which can achieve a natural transition in the target mask layer and improved visual perception.

Step 103: superimposing the target mask layer on the mask layer covering region in the video frame to display the target information by contrast.

The technical solution provided in the embodiment of the present disclosure has at least the following beneficial effects over the related art:

In the video mask layer display method provided by the embodiment of the present disclosure, the mask layer covering region determined in the video frame comprises: a first region matching the target information that is displayed by contrast, and a second region for color transition from the first region to another video portion on which no mask layer covering region is provided. Therefore, the first region is used to make the presentation of the target information clearer, and the second region is used to make the color transition between the first region and the video frame more natural, wherein the first region can be dynamically and adaptively adjusted according to the size of the target information, and the second region can also be dynamically and adaptively adjusted with the first region. Thus, the video frame after superimposing the target mask layer can clearly display the target information, and the problem of great influence on the color of the original video frame can be avoided.

In this embodiment, in the mask layer covering region of the video frame, the target mask layer is superimposed on the video frame. It should be noted that different superimposing processes can be carried out according to the application requirements such as color and saturation of the video picture. The examples are as follows:

Example 1: superimpose the target mask layer on a mask layer covering region at the top of the video frame.

Example 2: superimpose the target mask layer on a mask layer covering region at the bottom of the video frame.

Example 3: superimpose the target mask layer on mask layer covering regions at the top and bottom of the video frame. Because this superposition method superimposes the target mask layer on both the top and bottom of the video frame, the contrast effect of the target mask layer can be more obvious.

To sum up, in the video mask layer display method provided by the embodiment of the present disclosure, the mask layer covering region determined in the video frame comprises: a first region matching the target information that is displayed by contrast, and a second region for color transition from the first region to another video portion on which no mask layer covering region is provided. Therefore, the first region is used to make the presentation of the target information clearer, and the second region is used to make the color transition between the first region and the video frame more natural, wherein the first region can be dynamically and adaptively adjusted according to the size of the target information, and the second region can also be dynamically and adaptively adjusted with the first region. Thus, the video frame after superimposing the target mask layer can clearly display the target information, and the problem of great influence on the color of the original video frame can be avoided.

According to an embodiment of the present disclosure, the present disclosure further provides a video mask layer display apparatus.

Figure 6:
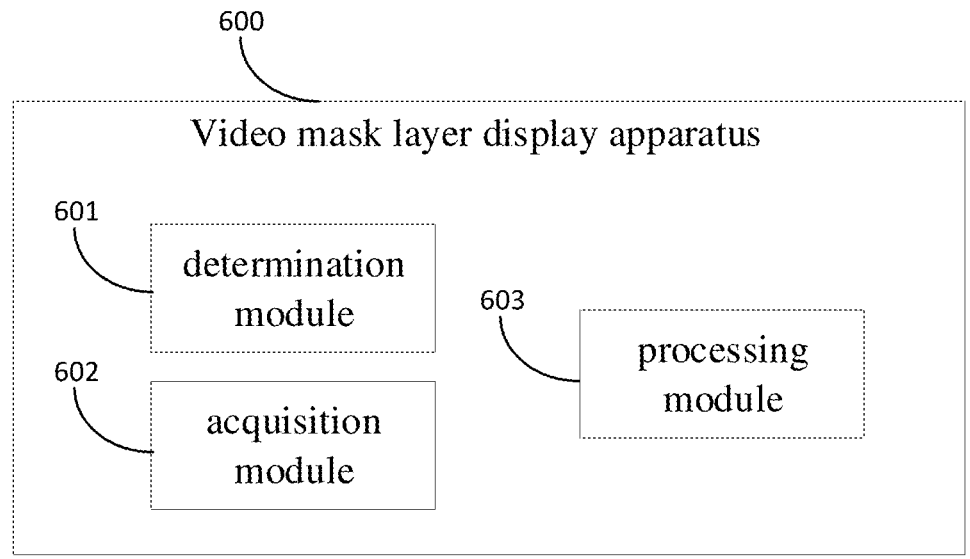
FIG. 6 is a schematic structural diagram of a video mask layer display apparatus provided in an embodiment of the present disclosure.

FIG. 6 is a schematic structural diagram of a video mask layer display apparatus according to an embodiment of the present disclosure. The device can be implemented by software and/or hardware, and can generally be integrated into an electronic device. As shown in FIG. 6, the display device 100 comprises a determination module 601 for determining a mask layer covering region in a video frame, wherein the mask layer covering region comprises: a first region that matches target information displayed by contrast, and a second region that effects a color transition from the first region to other video picture portion on which no mask layer covering region is provided;

an acquisition module 602 for acquiring a target mask layer that matches the first region and the second region and has a transparency gradient from the first region to the second region;

a processing module 603 for superimposing the target mask layer on the mask layer covering region in the video frame to display the target information by contrast.

Optionally, parameters of the first region are set in association with the size of the target information.

Optionally, the target information comprises: text information on the video frame picture that matches a preset information category; and/or text information or symbol information that matches a preset color identification on the video frame image.

Optionally, in a case where the target information comprises publisher information and video description information disposed in sequence at the bottom of the video frame, the determination module 601 is used for:

if the publisher information and the video description information are aligned with left and right sides of the video frame, calculating a first height from the publisher information to the bottom of the video frame, and determining the first region according to the first height and a width of the video frame; or if the publisher information and the video description information are aligned with the left side of the video frame, calculating a second height from the publisher information to the bottom of the video frame, and determining the first region according to the second height and an end position of each line of the publisher information and the video description information; or if the publisher information and the video description information are aligned with the right side of the video frame, calculating a third height from the publisher information to the bottom of the video frame, and determining the first region according to the third height and a starting position of each line of the publisher information and the video description information.

Optionally, the determination module 601 is used for:

determining an extension boundary line that can extend from the first region to another region of the video frame;

determining an extension amount according to region parameters of the other region and the first region;

determining the second region along the extension boundary line according to the extension amount.

Optionally, the acquisition module 602 is used for:

performing a gradient process on a mask layer matching the sizes of the first region and the second region according to a preset nonlinear curve function, and acquiring a target mask layer having a transparency gradient from the first region to the second region.

Optionally, the acquisition module comprises:

an acquisition unit for acquiring a mask layer pattern having a transparency gradient from the first region to the second region according to a splicing shape of the first and second regions;

a matching unit for cutting a target mask layer that matches the sizes of the first and second regions out from the mask layer pattern.

Optionally, the acquisition unit is used for:

in a case where the splicing shape of the first region and the second region comprises a fan shape, acquiring a radial mask layer pattern, wherein the radial mask layer pattern comprises a fan-shaped region having a transparency gradient from the first region to the second region; or in a case where the splicing shape of the first region and the second region comprises a rectangular shape, acquiring a rectangular mask layer pattern, wherein the rectangular mask layer pattern comprises a rectangular region having a transparency gradient from the first region to the second region.

Optionally, the processing module 603 is used for:

superimposing the target mask layer on a mask layer covering region at the top of the video frame, and/or superimposing the target mask layer on a mask layer covering region at the bottom of the video frame.

The video mask layer display apparatus provided in this embodiment of the present disclosure can execute the video mask layer display method provided in any embodiment of the present disclosure, and has corresponding functional modules to implement the method and achieve the beneficial effect of the present disclosure.

An embodiment of the present application also provides a computer program product containing a computer program/instructions, which when executed by a processor can implement the video mask layer display method provided in any embodiment of the present disclosure.

Figure 7:
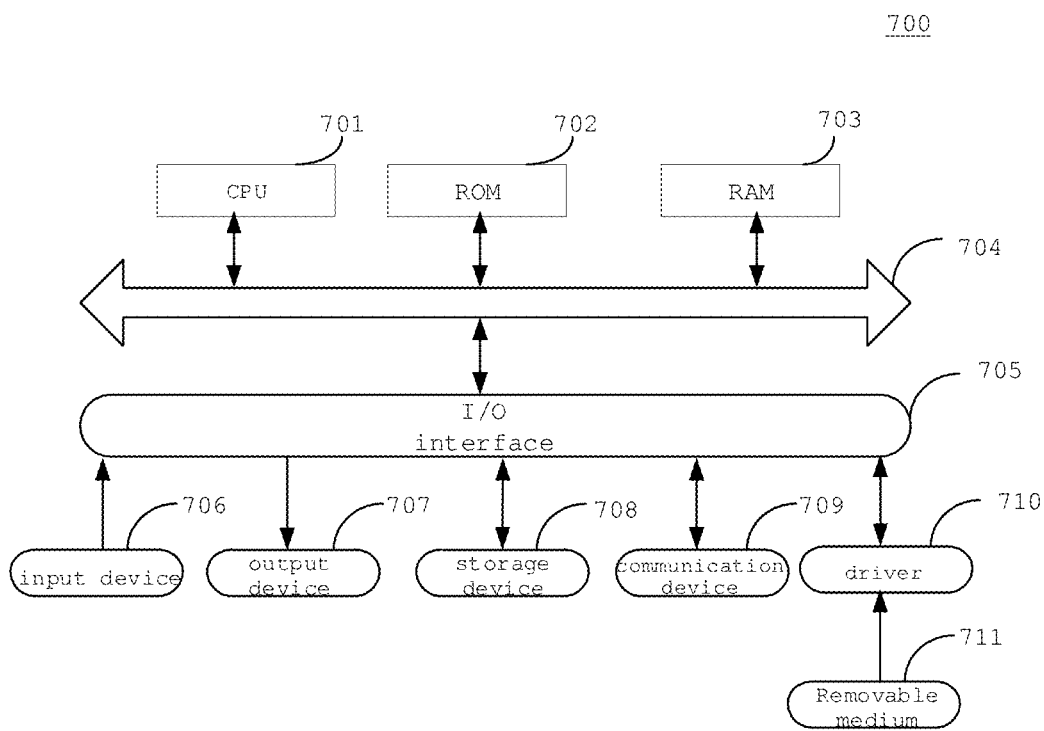
FIG. 7 is a structural diagram of an electronic device provided in an embodiment of the present disclosure.

FIG. 7 is a structural diagram of an electronic device provided in an embodiment of the present disclosure.

Referring now to FIG. 7, a structural diagram of an electronic device 700 suitable for implementing an embodiment of the present disclosure is shown. The electronic device 700 of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), or a wearable electronic device, and a fixed terminal such as a digital TV, a desktop computer, or a smart-home device. The electronic device shown in FIG. 7 is merely an example and should not impose any limitation on the function and scope of the embodiment of the present disclosure.

As shown in FIG. 7, the electronic device 700 may comprise a processing device (e.g., a central processing unit, a graphics processor) 701, which may perform various appropriate actions and processes according to a program stored in Read Only Memory (ROM) 702 or a program loaded from storage device 708 into Random Access Memory (RAM) 703. In RAM 703, various programs and data required for the operation of the electronic device 700 are also stored. Processing device 701, ROM 702 and RAM 703 are connected to each other through bus 704. Input/Output (I/O) interface 705 is also connected to bus 704.

Generally, the following devices can be connected to I/O interface 705: input devices 706 comprising, for example, a touch screen, a touch pad, a keyboard, a mouse, a camera, a microphone, an accelerometer, a gyroscope, etc; output devices 707 comprising a liquid crystal display (LCD), a speaker, a vibrator, etc.; storage devices 708 comprising, for example, a magnetic tape driver, a hard disk driver, etc.; and a communication device 709. The communication device 709 enables the electronic device 700 to communicate wirelessly or wirelessly with other devices to exchange data. Although FIG. 7 shows the electronic device 700 with various components, it should be understood that it is not required to implement or have all of these components. Alternatively, more or fewer components can be implemented or provided.

In particular, according to an embodiment of the present disclosure, the processes described above with reference to the flowchart can be implemented as a computer software program. For example, an embodiment of the present disclosure comprises a computer program product, which comprises a computer program carried on a non-transitory computer readable medium, and containing program code for executing the method shown in the flowchart. In such an embodiment, the computer program may be downloaded and installed from the network through the communication device 709, or installed from the storage device 708, or from the ROM 702. When the computer program is executed by the processing device 701, the above functions defined in the video mask layer display method of the embodiment of the present disclosure are performed.

It should be noted that the computer-readable medium in the present disclosure may be a computer-readable signal medium or a computer-readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wire, fiber optic cable, RF (radio frequency), etc., or any suitable combination of the foregoing.

In some embodiments, a client and a server can communicate using any currently known or future developed network protocol such as HTTP (HyperText Transfer Protocol), and can be interconnected by any form or medium of digital data communication, e.g., a communication network. Examples of communication networks comprise a local area network ("LAN") and a wide area network ("WAN"), the Internet, and end-to-end networks (for example, ad hoc end-to-end networks), as well as any currently known or future developed networks.

The above computer-readable medium may be comprised in the electronic device described above; or it may exist alone without being assembled into the electronic device.

The computer-readable medium carries one or more programs that cause, when executed by the electronic device, the electronic device to determine a mask layer covering region in a video frame, wherein the mask layer covering region comprises: a first region that matches target information displayed by contrast, and a second region that effects a color transition from the first region to other video picture portion on which no mask layer covering region is provided; acquire a target mask layer that matches the first region and the second region and has a transparency gradient from the first region to the second region; superimpose the target mask layer on the mask layer covering region in the video frame to display the target information by contrast. In the embodiment of the present disclosure, the first region is used to make the presentation of the target information clearer, and the second region is used to make the color transition between the first region and the video frame more natural, wherein the first region can be dynamically and adaptively adjusted according to the size of the target information, and the second region can also be dynamically and adaptively adjusted with the first region. Thus, the video frame after superimposing the target mask layer can clearly display the target information, and the problem of great influence on the color of the original video frame can be avoided.

The computer program code for executing operations of the present disclosure may be complied by any combination of one or more program design languages, the program design languages comprising object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, comprising local area network (LAN) or wide area network (WAN), or connected to external computer (for example using an internet service provider via Internet).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments described in the present disclosure can be implemented in software or hardware. Wherein, the names of the units do not constitute a limitation on the units themselves under certain circumstances.

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, the present disclosure provides a video mask layer display method, comprising:

determining a mask layer covering region in a video frame, wherein the mask layer covering region comprises: a first region that matches target information displayed by contrast, and a second region that effects a color transition from the first region to other video picture portion on which no mask layer covering region is provided;

acquiring a target mask layer that matches the first region and the second region and has a transparency gradient from the first region to the second region;

superimposing the target mask layer on the mask layer covering region in the video frame to display the target information by contrast.

According to one or more embodiments of the present disclosure, in the video mask layer display method provided by the present disclosure, parameters of the first region are set in association with the size of the target information.

According to one or more embodiments of the present disclosure, in the video mask layer display method provided by the present disclosure, the target information comprises:

text information on the video frame picture that matches a preset information category; and/or text information or symbol information that matches a preset color identification on the video frame image.

According to one or more embodiments of the present disclosure, in the video mask layer display method provided by the present disclosure, in a case where the target information comprises publisher information and video description information disposed in sequence at the bottom of the video frame, determining the first region comprises:

if the publisher information and the video description information are aligned with left and right sides of the video frame, calculating a first height from the publisher information to the bottom of the video frame, and determining the first region according to the first height and a width of the video frame; or if the publisher information and the video description information are aligned with the left side of the video frame, calculating a second height from the publisher information to the bottom of the video frame, and determining the first region according to the second height and an end position of each line of the publisher information and the video description information; or if the publisher information and the video description information are aligned with the right side of the video frame, calculating a third height from the publisher information to the bottom of the video frame, and determining the first region according to the third height and a starting position of each line of the publisher information and the video description information.

According to one or more embodiments of the present disclosure, in the video mask layer display method provided by the present disclosure, determining the second region comprises:

determining an extension boundary line that can extend from the first region to another region of the video frame;

determining an extension amount according to region parameters of the other region and the first region;

determining the second region along the extension boundary line according to the extension amount.

According to one or more embodiments of the present disclosure, in the video mask layer display method provided by the present disclosure, acquiring a target mask layer that matches the first region and the second region and has a transparency gradient from the first region to the second region comprises:

performing a gradient process on a mask layer matching the sizes of the first region and the second region according to a preset nonlinear curve function, and acquiring a target mask layer having a transparency gradient from the first region to the second region.

According to one or more embodiments of the present disclosure, in the video mask layer display method provided by the present disclosure, acquiring a target mask layer that matches the first region and the second region and has a transparency gradient from the first region to the second region comprises:

acquiring a mask layer pattern having a transparency gradient from the first region to the second region according to a splicing shape of the first and second regions;

cutting a target mask layer that matches the sizes of the first and second regions out from the mask layer pattern.

According to one or more embodiments of the present disclosure, in the video mask layer display method provided by the present disclosure, acquiring a mask layer pattern having a transparency gradient from the first region to the second region according to a splicing shape of the first and second regions comprises:

in a case where the splicing shape of the first region and the second region comprises a fan shape, acquiring a radial mask layer pattern, wherein the radial mask layer pattern comprises a fan-shaped region having a transparency gradient from the first region to the second region; or in a case where the splicing shape of the first region and the second region comprises a rectangular shape, acquiring a rectangular mask layer pattern, wherein the rectangular mask layer pattern comprises a rectangular region having a transparency gradient from the first region to the second region.

According to one or more embodiments of the present disclosure, in the video mask layer display method provided by the present disclosure, superimposing the target mask layer on the mask layer covering region in the video frame comprises:

superimposing the target mask layer on a mask layer covering region at the top of the video frame, and/or superimposing the target mask layer on a mask layer covering region at the bottom of the video frame.

According to one or more embodiments of the present disclosure, the present disclosure provides a video mask layer display apparatus, comprising:

a determination module for determining a mask layer covering region in a video frame, wherein the mask layer covering region comprises: a first region that matches target information displayed by contrast, and a second region that effects a color transition from the first region to other video picture portion on which no mask layer covering region is provided;

an acquisition module for acquiring a target mask layer that matches the first region and the second region and has a transparency gradient from the first region to the second region;

a processing module for superimposing the target mask layer on the mask layer covering region in the video frame to display the target information by contrast.

According to one or more embodiments of the present disclosure, in the video mask layer display apparatus provided by the present disclosure, parameters of the first region are set in association with the size of the target information.

According to one or more embodiments of the present disclosure, in the video mask layer display apparatus provided by the present disclosure, the target information comprises:

text information on the video frame picture that matches a preset information category; and/or text information or symbol information that matches a preset color identification on the video frame image.

According to one or more embodiments of the present disclosure, in the video mask layer display method provided by the present disclosure, in a case where the target information comprises publisher information and video description information disposed in sequence at the bottom of the video frame, the determination module is used for:

if the publisher information and the video description information are aligned with left and right sides of the video frame, calculating a first height from the publisher information to the bottom of the video frame, and determining the first region according to the first height and a width of the video frame; or if the publisher information and the video description information are aligned with the left side of the video frame, calculating a second height from the publisher information to the bottom of the video frame, and determining the first region according to the second height and an end position of each line of the publisher information and the video description information; or if the publisher information and the video description information are aligned with the right side of the video frame, calculating a third height from the publisher information to the bottom of the video frame, and determining the first region according to the third height and a starting position of each line of the publisher information and the video description information.

According to one or more embodiments of the present disclosure, in the video mask layer display apparatus provided by the present disclosure, the determination module is used for:

determining an extension boundary line that can extend from the first region to another region of the video frame;

determining an extension amount according to region parameters of the other region and the first region;

determining the second region along the extension boundary line according to the extension amount.

According to one or more embodiments of the present disclosure, in the video mask layer display apparatus provided by the present disclosure, the acquisition module is used for:

performing a gradient process on a mask layer matching the sizes of the first region and the second region according to a preset nonlinear curve function, and acquiring a target mask layer having a transparency gradient from the first region to the second region.

According to one or more embodiments of the present disclosure, in the video mask layer display apparatus provided by the present disclosure, the acquisition module comprises:

an acquisition unit for acquiring a mask layer pattern having a transparency gradient from the first region to the second region according to a splicing shape of the first and second regions;

a matching unit for cutting a target mask layer that matches the sizes of the first and second regions out from the mask layer pattern.

According to one or more embodiments of the present disclosure, in the video mask layer display apparatus provided by the present disclosure, the acquisition module is used for:

in a case where the splicing shape of the first region and the second region comprises a fan shape, acquiring a radial mask layer pattern, wherein the radial mask layer pattern comprises a fan-shaped region having a transparency gradient from the first region to the second region; or in a case where the splicing shape of the first region and the second region comprises a rectangular shape, acquiring a rectangular mask layer pattern, wherein the rectangular mask layer pattern comprises a rectangular region having a transparency gradient from the first region to the second region.

According to one or more embodiments of the present disclosure, in the video mask layer display apparatus provided by the present disclosure, the processing module is used for:

superimposing the target mask layer on a mask layer covering region at the top of the video frame, and/or superimposing the target mask layer on a mask layer covering region at the bottom of the video frame.

According to one or more embodiments of the present disclosure, the present disclosure provides an electronic device, comprising:

a processor;

a memory for storing processor executable instructions;

wherein the processor is used to read the executable instructions from the memory and execute the instructions to implement any of the video mask layer display methods provided by the present disclosure.

According to one or more embodiments of the present disclosure, the present disclosure provides a non-transitory computer-readable storage medium on which a computer program is stored, wherein the computer program is used to perform any of the video mask layer display methods provided in the present disclosure.

The above description is only preferred embodiments of the present disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the disclosed concept. For example, technical solutions formed by replacing the above features with technical features having similar functions to those disclosed in the present disclosure (but not limited to).

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A video mask layer display method, comprising:
determining a mask layer covering region in a video frame, wherein the mask layer covering region comprises a first region that matches target information displayed by contrast, and a second region that effects a color transition from the first region to other video picture portion of the video frame on which no mask layer covering region is provided;
acquiring a target mask layer that matches the first region and the second region and has a transparency gradient from the first region to the second region; and
superimposing the target mask layer on the mask layer covering region to display the target information by contrast,
wherein the determining a mask layer covering region in a video frame comprises:
determining an extension boundary line extending from the first region to another region of the video frame;
determining an extension amount according to one or more region parameters of the other region and the first region; and
determining the second region along the extension boundary line according to the extension amount.

2. The method according to claim 1, wherein one or more region parameters of the first region are set in association with a size of the target information.

3. The method according to claim 1, wherein the target information comprises at least one of
text information on the video frame picture that matches a preset information category, or
text information or symbol information that matches a preset color identification on the video frame picture.

4. The method according to claim 3, wherein in a case where the target information comprises publisher information and video description information disposed in sequence at the bottom of the video frame, the determining a mask layer covering region in a video frame comprises:
calculating a height from the publisher information to the bottom of the video frame, and determining the first region according to the height and a width of the video frame, if the publisher information and the video description information are aligned with left and right sides of the video frame.

5. The method according to claim 3, wherein in a case where the target information comprises publisher information and video description information disposed in sequence at the bottom of the video frame, the determining a mask layer covering region in a video frame comprises:
calculating a height from the publisher information to the bottom of the video frame, and determining the first region according to the height and an end position of each line of the publisher information and the video description information, if the publisher information and the video description information are aligned with the left side of the video frame.

6. The method according to claim 3, wherein in a case where the target information comprises publisher information and video description information disposed in sequence at the bottom of the video frame, the determining a mask layer covering region in a video frame comprises:
calculating a height from the publisher information to the bottom of the video frame, and determining the first region according to the height and a starting position of each line of the publisher information and the video description information, if the publisher information and the video description information are aligned with the right side of the video frame.

7. The method according to claim 1, wherein the determining a mask layer covering region in a video frame comprises:
determining size of the second region disposed adjacent to the first region, according to at least one of a width of the video frame, a height of the video frame or a ratio of the first region to the video frame and a preset correlation between the size of the second region and at least one of the width of the video frame, the height of the video frame or the ratio of the first region to the video frame.

8. The method according to claim 1, wherein the determining an extension amount according to one or more region parameters of the other region and the first region comprises:
determining the extension amount according to a region shape of the other region and a region shape the first region; or
determining the extension amount according to a region size of the other region and a region size the first region.

9. The method according to claim 1, wherein the acquiring a target mask layer that matches the first region and the second region and has a transparency gradient from the first region to the second region comprises:
performing a gradient process on a mask layer matching sizes of the first region and the second region according to a preset nonlinear curve function to acquire a target mask layer having a transparency gradient from the first region to the second region.

10. The method according to claim 1, wherein the acquiring a target mask layer that matches the first region and the second region and has a transparency gradient from the first region to the second region comprises:
acquiring a mask layer pattern having a transparency gradient from the first region to the second region according to a splicing shape of the first and second regions; and
cutting a target mask layer that matches sizes of the first and the second regions out from the mask layer pattern.

11. The method according to claim 10, wherein the acquiring a mask layer pattern having a transparency gradient from the first region to the second region according to a splicing shape of the first and second regions comprises:
acquiring a radial mask layer pattern, in a case where the shapes of the first region and the second region comprises a fan shape, wherein the radial mask layer pattern comprises a fan-shaped region having a transparency gradient from the first region to the second region; or
acquiring a rectangular mask layer pattern, in a case where the shapes of the first region and the second region comprises a rectangular shape, wherein the rectangular mask layer pattern comprises a rectangular region having a transparency gradient from the first region to the second region.

12. The method according to claim 1, wherein the superimposing the target mask layer on the mask layer covering region in the video frame comprises at least one of the following steps:
superimposing the target mask layer on the mask layer covering region at the top of the video frame, or superimposing the target mask layer on the mask layer covering region at the bottom of the video frame.

13. An electronic device, comprising:
a processor; and
a memory for storing processor executable instructions;
wherein the processor is used to read the executable instructions from the memory and execute the instructions to implement the video mask layer display method according to claim 1.

14. A non-transitory computer-readable storage medium, wherein the computer-readable storage medium stores instructions, which when executed on a terminal device, cause the terminal device to implement the video mask layer display method according to claim 1.

* * * * *